(12) United States Patent
Kubala et al.

(10) Patent No.: US 7,617,872 B1
(45) Date of Patent: Nov. 17, 2009

(54) SYSTEM AND METHOD FOR PERFORATED WELL SAND CONTROL

(75) Inventors: Gregory Kubala, Houston, TX (US); Philip F. Sullivan, Bellaire, TX (US); Kevin W. England, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/117,915

(22) Filed: May 9, 2008

(51) Int. Cl.
*E21B 43/114* (2006.01)
*E21B 43/26* (2006.01)

(52) U.S. Cl. .................. 166/298; 166/55.2; 166/280.2; 166/308.4

(58) Field of Classification Search ........................ None
See application file for complete search history.

(56) References Cited

U.S. PATENT DOCUMENTS

| | | | |
|---|---|---|---|
| 4,291,766 A | 9/1981 | Davies | |
| 4,427,069 A | 1/1984 | Friedman | |
| 4,669,543 A | 6/1987 | Young | |
| 4,919,209 A * | 4/1990 | King | ......................... 166/300 |
| 5,199,492 A | 4/1993 | Surles | |
| 5,222,558 A | 6/1993 | Montgomery | |
| 5,354,456 A | 10/1994 | Montgomery | |
| 5,492,178 A | 2/1996 | Nguyen | |
| 5,805,593 A | 9/1998 | Busche | |
| 6,279,655 B1 | 8/2001 | Pafitis | |
| 6,613,720 B1 | 9/2003 | Feraud | |
| 6,668,929 B2 * | 12/2003 | Griffith et al. | ............... 166/292 |
| 6,742,509 B2 | 6/2004 | Hunter | |
| 7,111,683 B2 | 9/2006 | Nelson | |
| 7,261,160 B2 | 8/2007 | Welton | |
| 2004/0147404 A1 * | 7/2004 | Thaemlitz et al. | ........... 507/100 |

* cited by examiner

*Primary Examiner*—Zakiya W. Bates
(74) *Attorney, Agent, or Firm*—Rachel E. Greene; David Cate; Robin Nava (57) ABSTRACT

In one embodiment, a system includes a cased wellbore disposed in a formation of interest. The system includes an emulsion positioned in the wellbore at a depth of the formation of interest. The emulsion includes an oil external phase and an aqueous internal phase. The oil external phase includes particles having calcium hydroxide. The aqueous internal phase includes insoluble silica particles. The system further includes a perforating tool that generates perforation tunnels through the cased wellbore into the formation of interest. The system further includes a well flow control device that shuts in the wellbore for a specified period of time. The emulsion breaks during contact with the formation in the perforation tunnels, and the calcium hydroxide and silica particles form a cementitious material that consolidates the perforation tunnels.

23 Claims, 5 Drawing Sheets

SYSTEM AND METHOD FOR PERFORATED WELL SAND CONTROL

BACKGROUND

The statements in this section merely provide background information related to the present disclosure and may not constitute prior art.

Unconsolidated formations present a particulates and fines migration problem. Currently available techniques are effective at controlling particulate migration but suffer from some drawbacks. For example, gravel packing controls particulates well, but in some instances cannot be performed before or during a perforation treatment, which in some highly unconsolidated formations can allow enough particulates in the wellbore to complicate post-perforation procedures and/or to destabilize the near-wellbore region of the formation. In some cases, treatments can be utilized during perforating, but the known treatments involve complex procedures with several stages, for example curable resin treatments, and/or sensitive chemistry subject to failure from common disturbances such as contacting brine in the wellbore. Accordingly, there is a demand for further improvements in this area of technology.

SUMMARY

One embodiment is a unique procedure for perforating a well with a single-stage consolidation fluid in the wellbore during perforation. Other embodiments include unique systems, methods, and apparatus to control post-perforation fines migration. Further embodiments, forms, objects, features, advantages, aspects, and benefits shall become apparent from the following description and drawings.

Methods and system embodiments may be used to treat any appropriate subterranean formation and wellbore penetrated such, including, but not limited to injection wells, water wells, wellbore used for hydrocarbon/gas production, and the like.

Methods and system embodiments may be suited for any wellbore/subterranean treatments understood in the art, including without limitation a hydraulic fracture treatment, a matrix acidizing treatment, an acid fracture treatment, or an energized and/or foamed fluid fracture treatment.

Some embodiments may be used with treatments termed "PerFRAC", where wireline-enabled perforating and fracturing operations involve fracture stimulation treatments down the casing with a perforating gun assembly in the wellbore. The perforating guns selectively perforate the zones, which are fracture stimulated one zone at a time. Isolation between stimulation zones may be accomplished by any suitable means, including use of ball sealers. Such an operation may provide effective isolation of each perforated zone within the stage, effective placement of specifically designed treatments into each perforated zone, treating each zone at a relatively high flow rate, and efficient completion of each stage in one wireline trip.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

Figure 1:
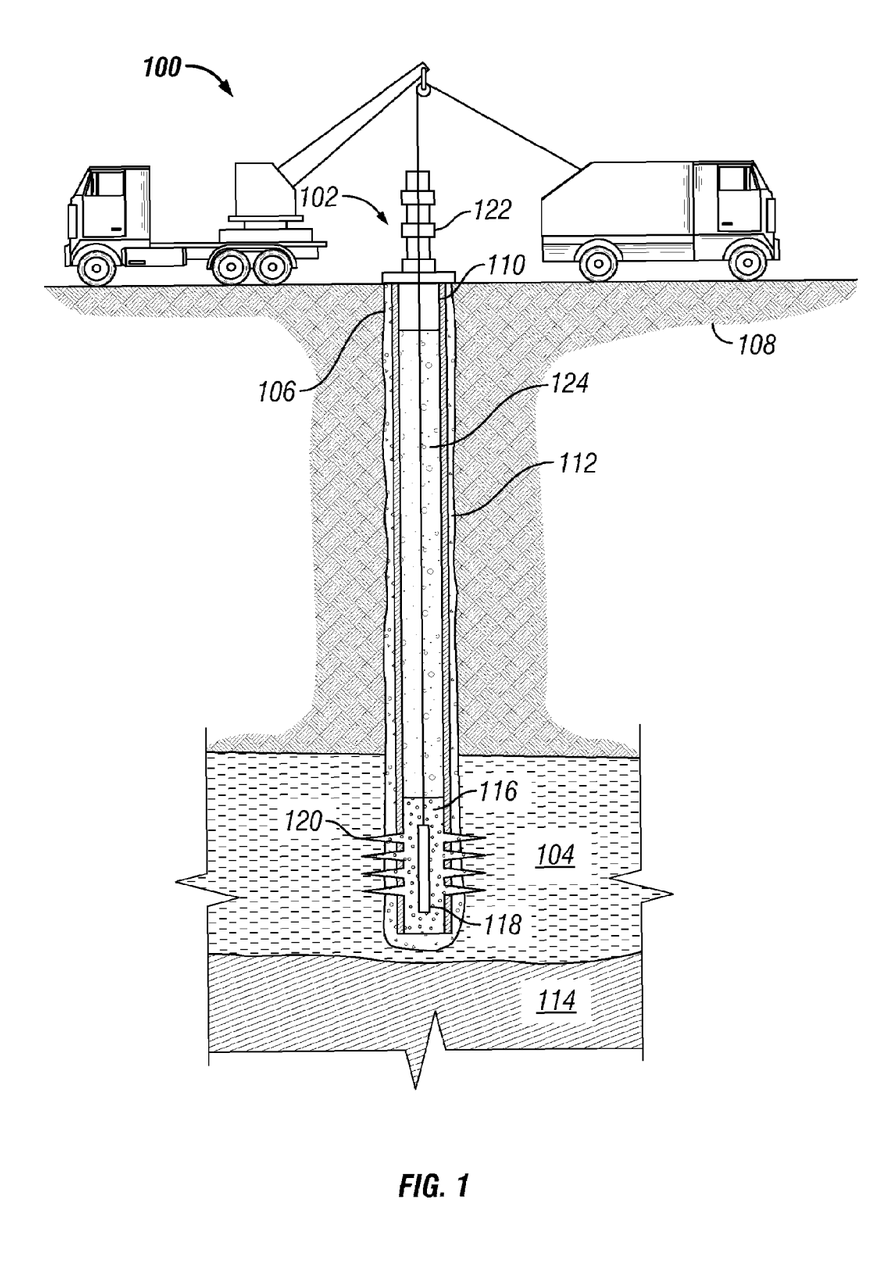
FIG. 1 is a schematic diagram of a system for perforated well sand control.

FIG. 1 is a schematic diagram of a system 100 for perforated well sand control. The system 100 includes a cased wellbore 102 in a formation of interest 104. The cased wellbore 102 may be any type of well known in the art, and in certain embodiments includes a drilled hole 106 through an overburden 108, with a casing 110 and cement layer 112 in the wellbore 102 to stabilize the well and isolate the various zones 104, 108, 114 from fluid communication. The formation of interest 104 includes a hydrocarbon producing formation, a formation that is a target for injected fluid, or any other formation wherein fluid conductivity between the wellbore 102 and the formation 104 is desirable. Further, the wellbore 102 may include deviated or horizontal sections, including in sections of the wellbore 102 through the formation of interest 104. The formation of interest 104 is illustrated as a single zone in the illustration of FIG. 1, but the formation of interest 104 may include multiple zones or reservoir layers, portions of a zone or reservoir layer, or any other section of the wellbore 102 where fluid communication is desirable between the wellbore 102 and the area surrounding the wellbore 102.

The system 100 further includes an emulsion 116 positioned in the wellbore 102 at a depth of the formation of interest 104. The emulsion is described more completely in FIG. 5 and the section referencing FIG. 5. Further, details of an emulsion utilized in certain embodiments are discussed in U.S. patent application Ser. No. 11/861,894 to Sullivan et al., entitled "Emulsion System for Sand Consolidation," filed Sep. 29, 2007, which is incorporated herein by reference and in the entirety. In certain embodiments, the emulsion includes an oil external phase having particles that include calcium hydroxide and the emulsion further includes an aqueous internal phase having insoluble silica particles.

In certain embodiments, the insoluble silica particles includes a pozzolan, fumed silica, precipitated silica, colloidal silica, calcined clay, and/or fly ash. In certain embodiments, the particles having calcium hydroxide and the insoluble silica particles have a median size of less than about fifty percent of a median pore size of a typical void in the formation of interest 104. In certain embodiments, the oil external phase to the aqueous internal phase has an oil to water ratio (volumetric) between about 30/70 to about 60/40. In certain embodiments, the oil to water ratio may be lower than 30/70, especially where high compression strength cementitious material (see FIG. 2 and referencing text) may be desirable including, without limitation, highly unconsolidated formations, high pressure formations, and high permeability formations.

In certain embodiments, the system 100 includes a molar ratio of the calcium hydroxide to the insoluble silica particles between about 0.8 and 2.5. The resulting reaction of lime (CaO) to silica ($SiO_2$) that occurs when the emulsion 116 breaks occurs in variable mol ratios, but generally occurs between the mol ratios of about 0.8 to 2.5.

In certain embodiments, the oil phase includes a first surfactant present in a first concentration and the aqueous phase includes a second surfactant present in a second concentration. The oil phase surfactant concentration varies depending upon the surfactant used, the oil composition, the amount of time for which the emulsion 116 must be stable, the temperature conditions at which the emulsion will be exposed, and other considerations understood in the art. Typical oil phase surfactant concentrations include about 5% or more by volume surfactant, for example a poly(isobutylene) ethanol amide at 5% by volume. The aqueous phase surfactant concentrations likewise vary for considerations understood in the art. Typical aqueous phase surfactant concentrations include about 5% or more by volume surfactant, for example a fatty acid ester at 5% by volume.

In certain embodiments, it is desirable to reduce the surfactant concentrations in the oil phase and/or the aqueous phase. For example, high surfactant concentrations can cause undesirable foaming, formation wetting changes, or other problems related to fluid chemistry and behavior. Further, surfactants tend to be expensive chemicals and reductions are desirable to reduce costs. In certain embodiments, the oil phase and aqueous phase portions of the emulsions can be separated such that a minimum emulsion stability time is required—for example, see FIG. 4 and referencing texts. In an exemplary embodiment, a standard emulsion formula includes surfactant amounts normally used in creating an emulsion—or nominal concentration values for the surfactants. In the exemplary embodiment, the oil phase includes a first surfactant present in a first concentration and the aqueous phase includes a second surfactant present in a second concentration, and at least one of the first and second concentrations is included in the emulsion 116 in an amount lower than about 80% of the nominal concentration value for that surfactant. For example, if the nominal surfactant concentration in the oil phase (the first surfactant concentration) is 6% surfactant by volume, the first surfactant concentration in certain embodiments is reduced to below about 4.8%. In the example, the time of exposure for the emulsion 116 may be reduced to offset the lower emulsion 116 stability relative to a stability of the standard emulsion formula. For example, the wellbore 102 may be perforated quickly after positioning the emulsion 116, or the emulsion 116 may be mixed downhole in the wellbore just before perforating. In certain embodiments, surfactant concentrations can be reduced to below 4% in the oil phase and/or aqueous phase, and in certain further embodiments surfactants can be completely removed from the oil phase and/or aqueous phase.

In certain embodiments, the system 100 includes a perforating tool 118 structured to generate perforation tunnels 120 through the cased wellbore 102 into the formation of interest 104. In the illustration of FIG. 1, the perforating tool 118 just generated the perforation tunnels 120 and the emulsion 116 has not yet entered the formation 104 through the perforation tunnels 120. The system 100 is illustrated as shown in FIG. 1 to schematically illustrate an exemplary position of the emulsion 116, the perforation tunnels 120, and the perforating tool 118. The perforating tool 118 includes a perforating gun, including through-tubing, through-casing, and/or coiled delivered perforating guns. Alternatively, the tool 118 could be used with pipe conveyed systems including jointed tubing, coiled tubing, drill string, and the like. Also, the tool 118 may be conveyed by tractor as well. Any device that generates perforation tunnels 120 is contemplated within the present application.

In certain embodiments, the system 100 includes a well control device 122 structured to shut in the wellbore 102 for a specified period of time. The specified period of time includes a time sufficient for the emulsion 116 to form cementitious material in the perforation tunnels 120. In certain embodiments, the emulsion 116 breaks after contacting sand in the formation of interest 104, and/or breaks after exposure to formation fluids and temperature over time. After the emulsion breaks, the calcium hydroxide and silica begin reacting to form a cementitious material. Any cementitious material should have compressive strength between about 100 psi and 1500 psi to contain any sand and fines migration from the formation of interest 104 and to consolidate and stabilize the perforation tunnel 120. Depending upon the temperature of the formation of interest 104, the concentration of the calcium hydroxide, and the desired compressive strength of the cementitious material, the specified period ranges from around five hours to several days. The determination of a specified period of time is dependent upon the specifics of a given embodiment of the system 100, and is easily determined through routine data gathering according to the formulation of the emulsion 116 and the conditions of the formation of interest 104.

In certain embodiments, the system 100 includes a well pressurizing mechanism that provides a specified pressure in the wellbore 102 at the depth of the formation of interest. In certain further embodiments, the specified pressure in the wellbore is greater than the pressure of the formation 104 fluid and less than the formation 104 fracture pressure. For example, where the depth of the formation 104 is 5000 feet, the fluid pressure gradient is 0.44 psi/ft, and the fracture gradient is 0.60 psi/ft, the specified pressure in certain embodiments is between about 2200 psi and 3000 psi. The well pressurizing mechanism includes any method understood in the art, including at least positioning a spacer fluid 124 with a density such that the specified pressure is achieved and a pump (not shown) pressurizing the wellbore and the well control device 122 holding the pressure in the wellbore until the perforating tool 118 generates the perforation tunnels 120. The density of the spacer fluid 124 and the emulsion 116 may be sufficient to maintain the emulsion 116 at the depth of the formation of interest 104, or the spacer fluid 124 and the emulsion 116 may be separated by mechanical means (e.g. a plug or packer) or by positioning the emulsion 116 and spacer fluid 124 interface within a narrow tubing where significant mixing is unlikely during the time between placement and perforating the formation 104.

In certain embodiments, the well pressurizing mechanism provides a pressure profile in the wellbore 102 at the depth of the formation of interest 104. The pressure profile in certain embodiments includes a dynamic underbalance pressure profile. For example, the pressure in the wellbore 102 at the depth of the formation of interest 104 may be above (overbalanced), or below (underbalanced), or the same as (balanced) the formation fluid pressure before the perforating tool 118 perforates the wellbore 102. In an embodiment utilizing a dynamic underbalance pressure profile, the pressure in the wellbore 102 at the depth of the formation of interest 104 may be momentarily lowered below the formation fluid pressure and then raised and/or returned to a higher pressure level. A dynamic underbalance pressure profile may be implemented by any method known in the art, including without limitation: by utilizing a surge chamber, vents, and/or through proper design of the perforating tool 118 to create a momentary low-pressure zone at the perforation tunnels 120 after perforating.

Figure 2:
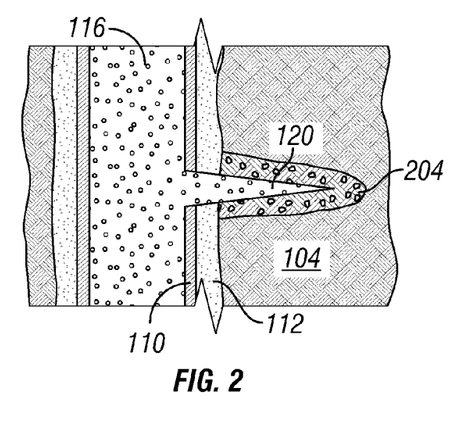
FIG. 2 is a schematic diagram of a perforation tunnel.

FIG. 2 is a schematic diagram of a perforation tunnel 120. The perforation tunnel 120 extends through the casing 110 and the cement layer 112 into the formation of interest 104. In certain embodiments, the perforation tunnel 120 includes a crushed zone 204 around the perforation tunnel 120. In an unconsolidated formation, fines from the formation can migrate into the wellbore 102, causing problems with handling of fines, wearing out equipment, and environmental concerns with fines disposal. Further, bulk crushed material can cause significant damage to the permeability and/or conductivity of the perforation tunnel 120. In certain embodiments, the perforation tunnel 120 is created in an underbalanced condition, causing an initial surge of debris to exit the perforation tunnel 120 into the wellbore 102 and enhancing the conductivity of the perforation tunnel 120. In certain further embodiments, the perforation tunnel 120 is created in a condition wherein the emulsion 116 enters the perforation tunnel 120 and begins to form cementitious material that consolidates and stabilizes the perforation tunnel 120.

In one example, the perforation occurs in a dynamically underbalanced condition, where the area surrounding the perforation is briefly underbalanced immediately after perforating, and where the area surrounding the perforation returns to an overbalanced condition briefly after, forcing the emulsion 116 into the perforation tunnel 120. In certain embodiments, the perforation tunnel 120 may be created in a completely overbalanced condition, where initial perforation debris is either expected to cause little effect on the productivity of the formation of interest 104, or where a subsequent stimulation treatment is expected to clear away any perforation tunnel 120 damage. In certain embodiments, the perforation tunnel 120 may be produced in a balanced or underbalanced condition, and the emulsion 116 enters the perforation tunnel 120 through fluid exchange mechanisms such as a fluid density differential with the formation fluid.

Figure 3:
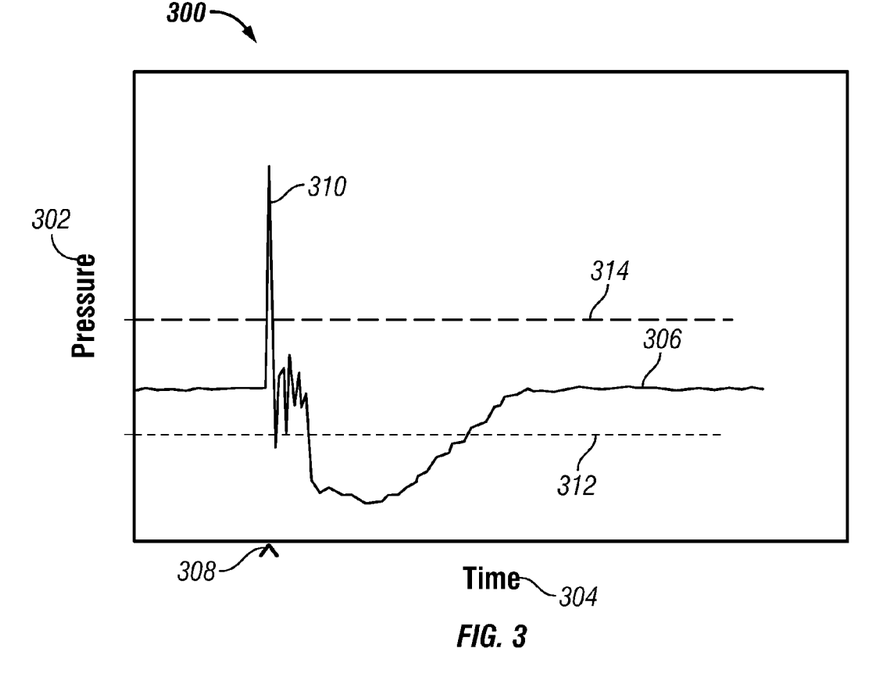
FIG. 3 is an illustration of bottom hole pressure versus time through a perforating event.

FIG. 3 is an illustration 300 of bottom hole pressure 302 versus time 304 through a perforating event. In the illustration 300, the plotted pressure 306 shows the pressure 302 versus time 304, and the perforating event occurs at a time 308. The illustration 300 is consistent with a perforating event performed where the wellbore 102 is overbalanced, and the perforation is performed in a dynamically underbalanced manner. At the time 308, the plotted pressure 306 spikes due to detonation of the perforating gun, and the plotted pressure quickly drops below a formation fluid pressure 312. After a short period of time, typically between less than half a second and a couple of seconds, the plotted pressure 306 returns to the starting pressure value or to some other designed pressure value. In certain embodiments, except for potential excursions during the detonation of the perforating tool 118, the plotted pressure is maintained below a formation fracturing pressure 314.

Figure 4:
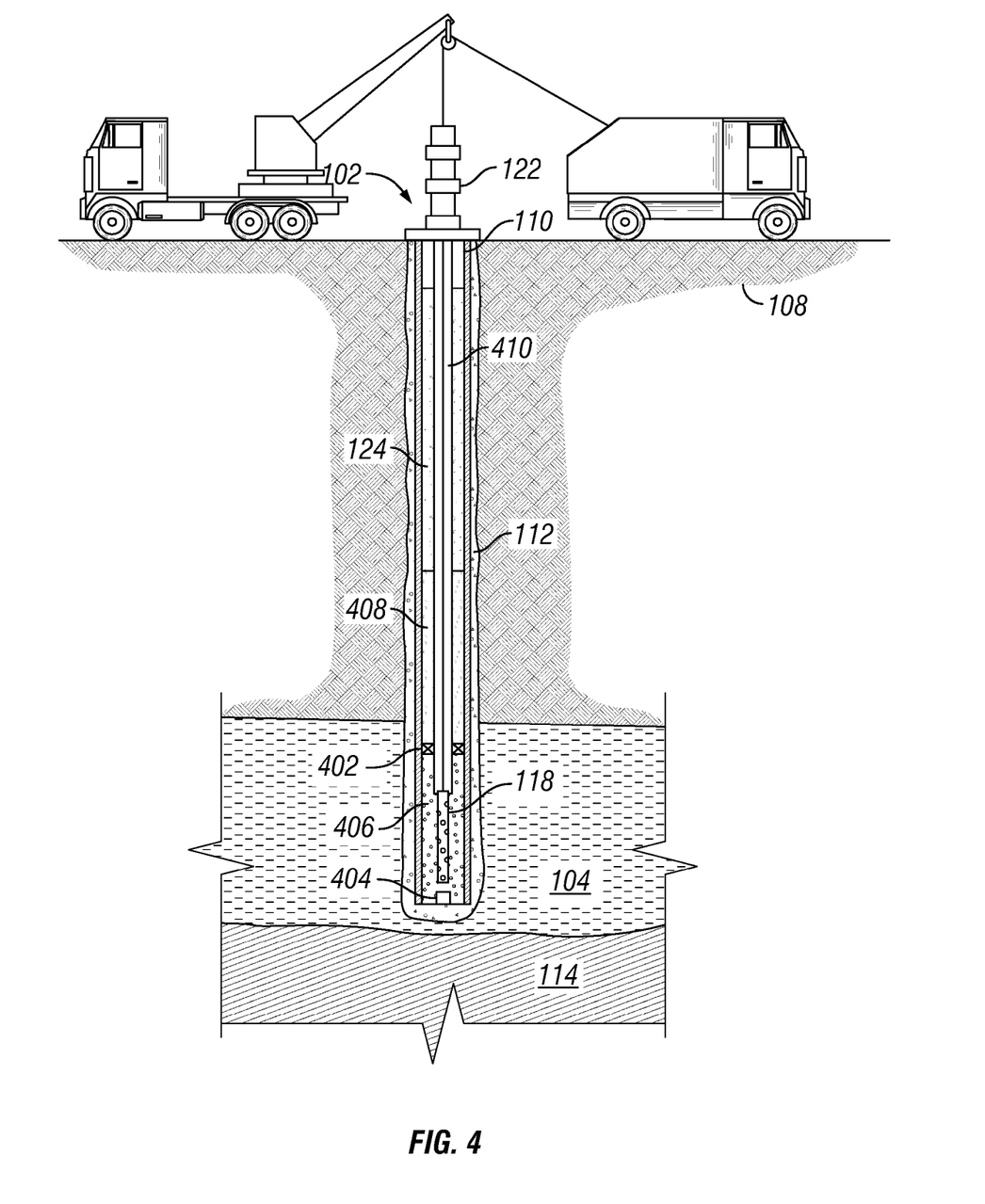
FIG. 4 is a schematic diagram of an alternate embodiment of a system for perforated well sand control.

FIG. 4 is a schematic diagram of an alternate embodiment of a system 400 for perforated well sand control. The system 400 of FIG. 4 is similar to the system 100 of FIG. 1, with significant differences described herein. In the system 400, the perforating tool 118 is illustrated as a through-tubing perforating gun that has not yet perforated the wellbore 102. An oil phase 406 is positioned at a specified depth in the wellbore 102, and an aqueous phase 408 is positioned above the specified depth in the wellbore 102. In certain embodiments, the aqueous phase 408 is positioned in a tubing 410 casing annulus, where a downhole tool 402 prevents mixing of the oil phase 406 and the aqueous phase 408 until the tool 402 is manipulated (e.g. mechanically, electrically, hydraulically, or through other means understood in the art) to release the aqueous phase 408 into the oil phase 406. In certain embodiments, an optional downhole circulating device, for example a pump or impeller, is operated to mix the aqueous phase 408 with the oil phase 406 and create an emulsion 116.

Figure 5:
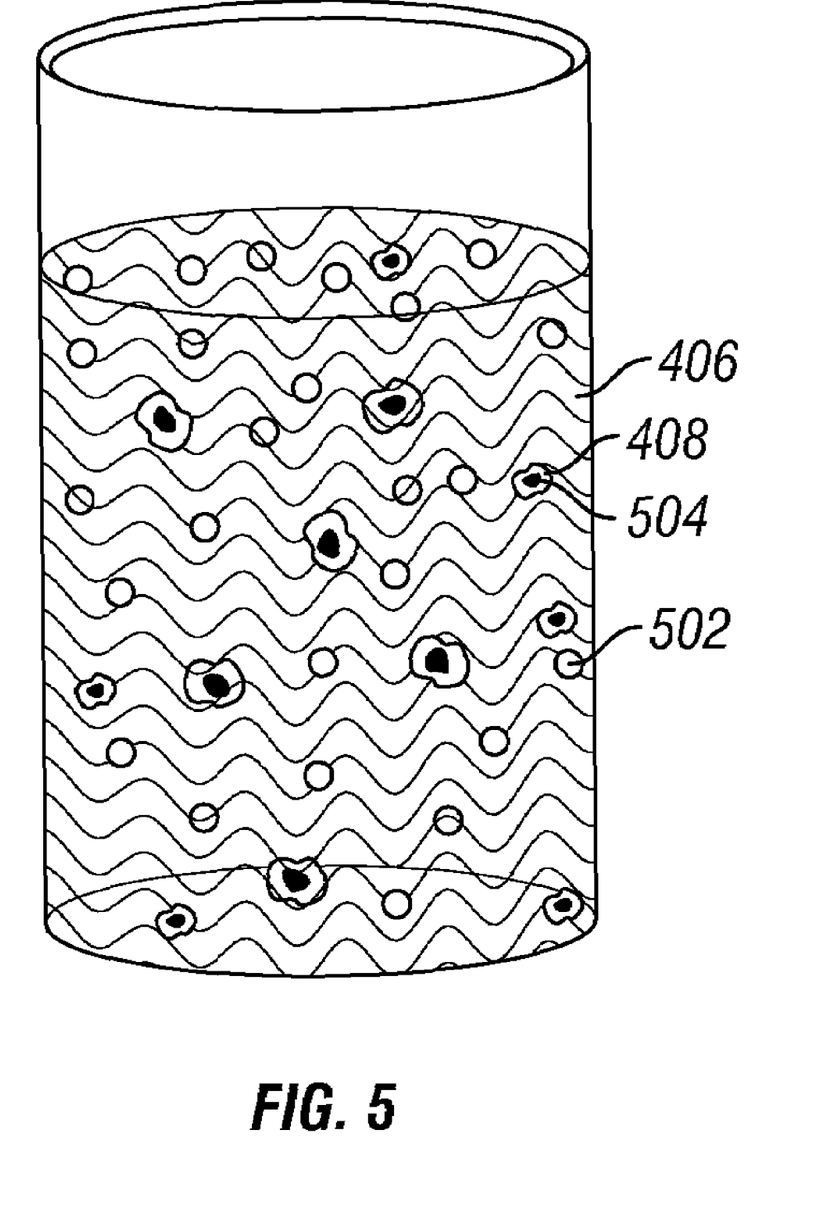
FIG. 5 is an illustration of a consolidation fluid.

FIG. 5 is an illustration of a consolidation fluid. In certain embodiments, the consolidation fluid is an emulsion 116 including an oil phase 406 and an aqueous phase 408. The oil phase includes particles 502 having calcium hydroxide, and the aqueous phase 408 includes insoluble silica particles 504. The phases and particles of the emulsion 116 are not shown to scale, and the proportions of oil phase 406 to aqueous phase 408 may be any values as otherwise described herein. The emulsion 116 may include surfactants as needed for the system 100 conditions and stability time needed, and the surfactants may be in the oil phase 406 and/or aqueous phase 408.

The schematic flow diagram and related description which follows provides an illustrative embodiment of performing operations for perforated well sand control. Operations illustrated are understood to be exemplary only, and operations may be combined or divided, and added or removed, as well as re-ordered in whole or part, unless stated explicitly to the contrary herein.

Figure 6:
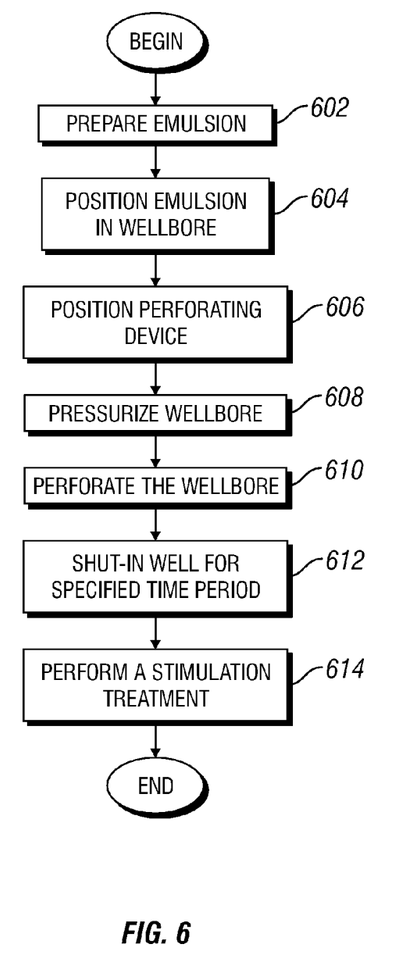
FIG. 6 is a schematic flow diagram of a procedure for perforated well sand control.

FIG. 6 is a schematic flow diagram of a procedure 600 for perforated well sand control. The procedure 600 includes an operation 602 to prepare an emulsion 116 and an operation 604 to place an emulsion, by a suitable means, in a wellbore at a target depth. The procedure 600 further includes an operation 604 to position a perforating device at the specified depth, an operation 606 to pressurize the wellbore 102, and an operation 608 to perforate the wellbore 102 at the specified depth. The procedure 600 further includes an operation 612 to shut in the wellbore 102 for a specified time period. In certain embodiments, the procedure 600 includes an operation 614 to perform a stimulation treatment. The stimulation treatment may be any treatment understood in the art for the formation of interest 104, including without limitation a hydraulic fracture treatment, a matrix acidizing treatment, an acid fracture treatment, or an energized and/or foamed fluid fracture treatment.

Figure 7:
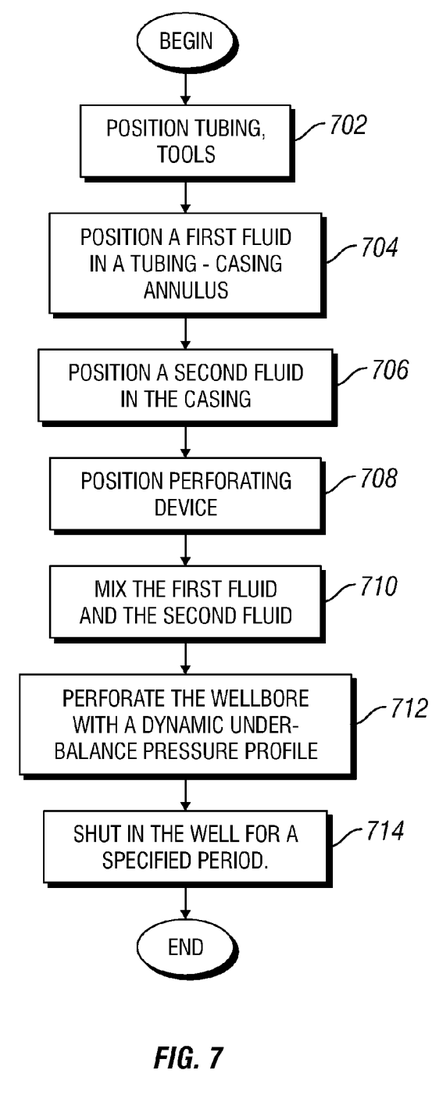
FIG. 7 is a schematic flow diagram of a technique for perforated well sand control.

FIG. 7 is a schematic flow diagram of a technique 700 for perforated well sand control. The technique 700 includes an operation 702 to position tubing 410 and tools (e.g. a perforating device 118 and/or a downhole circulating device 404) in a wellbore 102. The technique 700 further includes an operation 704 to position a first fluid in a tubing-casing annulus, where the first fluid is an aqueous phase including insoluble silica particles. The technique 700 further includes an operation 706 to position a second fluid in the casing 110 at a specified depth, where the second fluid is an oil phase including calcium hydroxide. In some cases, the available depths for the fluid to be position are in the casing below the end of the tubing; however, a portion of the second fluid may be placed in the tubing, casing, and/or tubing-casing annulus. The technique 700 further includes an operation 708 to position a perforating device in the wellbore 102 at the specified depth. The technique 700 further includes an operation 710 to mix the first fluid and the second fluid, and an operation 712 to perforate the wellbore with a dynamic underbalance pressure profile. In some instances it be efficient to mix the emulsion prior to positioning the perforating device at the specified depth; the perforating device could be position above the position where the emulsion is mixed and then lowered to the specified depth once the mixing is complete. The technique 700 further includes an operation 714 to shut in the well for a specified time period.

As is evident from the figures and text presented above, a variety of embodiments according to the invention are contemplated.

One exemplary embodiment is a method including preparing an emulsion. The emulsion includes an oil external phase including particles comprising calcium hydroxide and an aqueous internal phase including insoluble silica particles. The method further includes positioning an amount of the emulsion at a specified depth in a wellbore, perforating the wellbore at the specified depth, and shutting in the wellbore for a specified time period after the perforating.

In certain embodiments, the method further includes providing a specified pressure in the wellbore at the specified depth, where the specified pressure is greater than a formation fluid pressure at the specified depth and less than a formation fracture pressure at the specified depth. In certain embodiments, the method includes providing a pressure profile in the wellbore at the specified depth, where the pressure profile includes a dynamic underbalance pressure profile. In certain further embodiments, the dynamic underbalance pressure profile includes a final pressure that is greater than a formation fluid pressure at the specified depth and less than a formation fracture pressure at the specified depth. In certain embodiments, the oil external phase to aqueous internal phase comprises an oil to water ratio between about 30/70 to about 60/40. In certain embodiments, the oil external phase to aqueous internal phase comprises an oil to water ratio lower than about 40/60.

In certain embodiments, the specified time period includes a time period sufficient for the calcium hydroxide and the insoluble silica particles to form a cementitious material disposed in the perforation tunnel, where the cementitious material has a compressive strength greater than about 100 psi. In certain further embodiments, the specified time period includes a time period sufficient for the calcium hydroxide and the insoluble silica particles to form a cementitious material disposed in the perforation tunnel, where the cementitious material has a compressive strength between about 100 psi and about 1500 psi. In certain embodiments, the method further includes performing a stimulation treatment at the specified depth in the wellbore.

One exemplary embodiment is a method including positioning an oil phase including particles comprising calcium hydroxide in a wellbore at a specified depth, and positioning an aqueous phase including insoluble silica particles in the wellbore above the specified depth. In certain embodiments, the method includes positioning a perforating device in the wellbore at the specified depth, mixing the oil phase and the aqueous phase after positioning the perforating device, perforating the wellbore after the mixing, and shutting in the wellbore for a specified time period after the perforating.

In certain further embodiments, positioning the aqueous phase including insoluble silica particles in the wellbore above the specified depth includes positioning the aqueous phase in a tubing-casing annulus. In certain further embodiments, mixing the oil phase and the aqueous phase includes operating a downhole circulating device. In certain embodiments, at least one of the oil phase and the aqueous phase do not include surfactants. In certain embodiments, the oil phase includes a first surfactant present in a first concentration, the aqueous phase includes a second surfactant present in a second concentration, and at least one of the first concentration and the second concentration comprise a concentration value less than about 80% of a nominal concentration value. In certain embodiments, the oil phase includes a first surfactant present in a first concentration, the aqueous phase includes a second surfactant present in a second concentration, and each of the first and second concentrations include concentration values between 0% and about 4% surfactant, inclusive.

One exemplary embodiment is a system including a cased wellbore disposed in a formation of interest, an emulsion positioned in the wellbore at a depth of the formation of interest, where the emulsion includes an oil external phase including particles having calcium hydroxide, and an aqueous internal phase including insoluble silica particles. In certain embodiments, the system includes a perforating tool structured to generate perforation tunnels through the cased wellbore into the formation of interest, and a well flow control device structured to shut in the wellbore for a specified period of time.

In certain further embodiments, the system includes a well pressurizing means that provides a specified pressure in the wellbore at the depth of the formation of interest, where the specified pressure is greater than a formation fluid pressure at the specified depth and less than a formation fracture pressure at the specified depth. In certain embodiments, the system includes a well pressurizing means that provides a pressure profile in the wellbore at the depth of the formation of interest, wherein the pressure profile includes a dynamic underbalance pressure profile. In certain embodiments, the insoluble silica particles include pozzolan, fumed silica, precipitated silica, colloidal silica, calcined clay, and/or fly ash. In certain embodiments, the particles having calcium hydroxide and the insoluble silica particles include particles having a median size of less than about fifty percent of a median pore size of a typical void in the formation of interest. In certain embodiments, the oil external phase to aqueous internal phase includes an oil to water ratio between about 30/70 to about 60/40. In certain embodiments, a molar ratio of the calcium hydroxide to the insoluble silica particles includes a ratio from about 0.8 to about 2.5. In certain embodiments, the oil phase includes a first surfactant present in a first concentration, and the aqueous phase includes a second surfactant present in a second concentration, where each of the first and second concentrations include concentration values between 0% and about 4% surfactant, inclusive.

Embodiments of the invention may use any suitable means for perforation known to those of skill in the art, including propellants, jetting, and the like.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
preparing an emulsion comprising: an oil external phase including particles comprising calcium hydroxide and an aqueous internal phase comprising insoluble silica particles;
positioning an amount of the emulsion at a specified depth in a wellbore;
providing a specified pressure in the wellbore at the specified depth, wherein the specified pressure is greater than a formation fluid pressure at the specified depth and less than a formation fracture pressure at the specified depth;
perforating the wellbore at the specified depth; and
shutting in the wellbore for a specified time period after the perforating.

2. The method of claim 1, further comprising providing a pressure profile in the wellbore at the specified depth, wherein the pressure profile includes a dynamic underbalance pressure profile.

3. The method of claim 2, wherein the dynamic underbalance pressure profile includes a final pressure that is greater than a formation fluid pressure at the specified depth and less than a formation fracture pressure at the specified depth.

4. The method of claim 3, wherein the oil external phase to aqueous internal phase comprises an oil to water ratio between about 30/70 to about 60/40.

5. The method of claim 3, wherein the oil external phase to aqueous internal phase comprises an oil to water ratio lower than about 40/60.

6. The method of claim 5, wherein the specified time period comprises a time period sufficient for the calcium hydroxide and the insoluble silica particles to form a cementitious material disposed in the perforation tunnel, wherein the cementitious material has a compressive strength greater than about 100 psi.

7. The method of claim 5, wherein the specified time period comprises a time period sufficient for the calcium hydroxide and the insoluble silica particles to form a cementitious material disposed in the perforation tunnel, wherein the cementitious material has a compressive strength between about 100 psi and about 1500 psi.

8. The method of claim 1, further comprising performing a stimulation treatment at the specified depth in the wellbore.

9. The method of claim 1 as used wireline-enabled perforating and fracturing operations performed on a plurality treatment zones.

10. A method, comprising:
positioning an oil phase including particles comprising calcium hydroxide in a wellbore at a specified depth;
positioning an aqueous phase comprising insoluble silica particles in the wellbore above the specified depth;
positioning a perforating device in the wellbore at the specified depth;
mixing the oil phase and the aqueous phase after positioning the perforating device;
perforating the wellbore after the mixing; and
shutting in the wellbore for a specified time period after the perforating.

11. The method of claim 10, wherein positioning the aqueous phase comprising insoluble silica particles in the wellbore above the specified depth comprises positioning the aqueous phase in a tubing-casing annulus.

12. The method of claim 10, wherein mixing the oil phase and the aqueous phase includes operating a downhole circulating device.

13. The method of claim 12, wherein at least one of the oil phase and the aqueous phase do not include surfactants.

14. The method of claim 10, wherein the oil phase includes a first surfactant present in a first concentration, wherein the aqueous phase includes a second surfactant present in a second concentration, and wherein at least one of the first concentration and the second concentration comprise a concentration value less than about 80% of a nominal concentration value.

15. The method of claim 10, wherein the oil phase includes a first surfactant present in a first concentration, wherein the aqueous phase includes a second surfactant present in a second concentration, and wherein each of the first and second concentrations comprise concentration values between 0% and about 4% surfactant, inclusive.

16. A system, comprising:
a cased wellbore disposed in a formation of interest;
an emulsion positioned in the wellbore at a depth of the formation of interest, the emulsion comprising an oil external phase including particles comprising calcium hydroxide and an aqueous internal phase comprising insoluble silica particles;
a perforating tool structured to generate perforation tunnels through the cased wellbore into the formation of interest; and
a well flow control device structured to shut in the wellbore for a specified period of time.

17. The system of claim 16, further comprising a well pressurizing means that provides a specified pressure in the wellbore at the depth of the formation of interest, wherein the specified pressure is greater than a formation fluid pressure at the specified depth and less than a formation fracture pressure at the specified depth.

18. The system of claim 16 further comprising a well pressurizing means that provides a pressure profile in the wellbore at the depth of the formation of interest, wherein the pressure profile includes a dynamic underbalance pressure profile.

19. The system of claim 16, wherein the insoluble silica particles comprise a member selected from the group consisting of pozzolan, fumed silica, precipitated silica, colloidal silica, calcined clay, and fly ash.

20. The system of claim 16, wherein the particles comprising calcium hydroxide and the insoluble silica particles comprise particles having a median size of less than about fifty percent of a median pore size of a typical void in the formation of interest.

21. The system of claim 16, wherein the oil external phase to aqueous internal phase comprises an oil to water ratio between about 30/70 to about 60/40.

22. The system of claim 16, wherein a molar ratio of the calcium hydroxide to the insoluble silica particles comprises a ratio from about 0.8 to about 2.5.

23. The system of claim 16, wherein the oil phase includes a first surfactant present in a first concentration, wherein the aqueous phase includes a second surfactant present in a second concentration, and wherein each of the first and second concentrations comprise concentration values between 0% and about 4% surfactant, inclusive.

* * * * *